United States Patent
Lavy

(10) Patent No.: US 12,244,921 B2
(45) Date of Patent: Mar. 4, 2025

(54) LOW POWER CONTINUOUS DASHCAM RECORDING

(71) Applicant: Nexar Ltd., Tel Aviv (IL)

(72) Inventor: Lev Yitzhak Lavy, Misgav Dov (IL)

(73) Assignee: Nexar Ltd., Tel Aviv (IL)

( * ) Notice: Subject to any disclaimer, the term of this patent is extended or adjusted under 35 U.S.C. 154(b) by 59 days.

(21) Appl. No.: 18/217,559

(22) Filed: Jul. 1, 2023

(65) Prior Publication Data

US 2024/0015395 A1 Jan. 11, 2024

Related U.S. Application Data

(60) Provisional application No. 63/359,880, filed on Jul. 11, 2022.

(51) Int. Cl.

| | |
|---|---|
| *H04N 23/65* | (2023.01) |
| *G06F 1/3234* | (2019.01) |
| *H04N 7/18* | (2006.01) |
| *H04N 23/52* | (2023.01) |
| *H04N 23/667* | (2023.01) |

(52) U.S. Cl.
CPC .......... *H04N 23/651* (2023.01); *G06F 1/325* (2013.01); *H04N 7/181* (2013.01); *H04N 23/52* (2023.01); *H04N 23/667* (2023.01)

(58) Field of Classification Search
CPC ...... H04N 23/651; H04N 7/181; H04N 23/52; H04N 23/667; G06F 1/325
See application file for complete search history.

(56) References Cited

U.S. PATENT DOCUMENTS

| | | | | |
|---|---|---|---|---|
| 11,074,770 | B2* | 7/2021 | Uliyar | H04N 23/90 |
| 11,100,801 | B2* | 8/2021 | Pipe | G08G 1/166 |
| 11,107,181 | B2* | 8/2021 | Kodukula | G06F 1/3243 |
| 11,182,319 | B1* | 11/2021 | Huang | G06F 13/1673 |
| 11,436,844 | B2* | 9/2022 | Carruthers | H04N 7/181 |
| 11,962,899 | B2* | 4/2024 | Elizov | H04N 23/651 |
| 2021/0094582 | A1* | 4/2021 | Lee | G11B 27/031 |
| 2024/0046409 | A1* | 2/2024 | An | G06V 30/1902 |
| 2024/0047774 | A1* | 2/2024 | Osada | H01M 50/105 |

* cited by examiner

*Primary Examiner* — John A Tweel, Jr.
(74) *Attorney, Agent, or Firm* — Soquel Group I.P Ltd.

(57) ABSTRACT

A system including an image sensor mounted on a vehicle, memory storing data captured by the image sensor, a buffer for temporarily storing data, an inertial measurement unit (IMU) that senses an impact on the vehicle, a switch connected to the image sensor, a main system on chip (SOC) connected to the image sensor via the switch, that stores data in the memory, the main SOC being in a dormant power mode while the vehicle is parked or idle, and in an active power mode while the vehicle is moving, and transitioning from dormant mode to active mode when the IMU senses that the vehicle suffers an impact, and a low-power secondary SOC microcontroller connected to the image sensor via the switch, that manages power of the system and stores data in the buffer, the buffer storing data that was captured prior to and upon the IMU detecting an impact.

12 Claims, 2 Drawing Sheets

LOW POWER CONTINUOUS DASHCAM RECORDING

CROSS REFERENCE TO PRIORITY APPLICATION

This application is a non-provisional of U.S. Provisional Application No. 63/359,880, entitled LOW POWER CONTINUOUS DASHCAM RECORDING, and filed on Jul. 11, 2022 by inventor Lev Yitzhak Lavy, the contents of which are hereby incorporated herein in their entirety.

FIELD OF THE INVENTION

The present invention relates to a power management system for low power continuous dashcam recording for vehicles, even while the vehicles are idle or parked.

BACKGROUND OF THE INVENTION

A dashcam device is typically used by consumers and fleets for capturing collision and other incident evidence on the road. When a vehicle is idle, e.g., for the night, the dashcam switches to parking mode. Currently the parking mode user experience is very limited. For most cases the dashcam is installed by the driver and is connected to the cigarette lighter and not connected to the car battery, so the dashcam needs to use a small internal battery while parking. In case of impact an inertial measurement system (IMU) wakes the dashcam to collect evidence, and the dashcam starts capturing video footage only 3-10 seconds after impact time. Latency in capturing evidence, and the inability to capture data prior to the impact, results in vital evidence being missed, especially for incidents of hit-and-run and vandalism.

Reference is made to FIG. 1, which is a prior art power management system 100 for dashcams. System 100 includes nine primary components; namely, a system-on-chip (SOC) 110, a global navigation satellite system (GNSS) 120, an inertial measurement unit (IMU) 130, an image sensor 140, a microphone 150, a power management unit (PMU) 160, a long term evolution (LTE) module 170, a Wi-Fi/BLUETOOTH® Low Energy (BLE) transmitter 180, and a secure digital (SD) non-volatile flash memory card 190.

PMU 160 controls SOC 110 and other components' power, and is triggered to wake up from sleep, when the vehicle is parked, by a dedicated pin connected to IMU 130, which is set to work in low-power mode, and only triggers PMU 160 on impact. While this mode potentially allows weeks of use if no trigger happens, as IMU 130 power is sub-mW and the battery capacity is typically 300-600 mAh, it provides poor user experience due to the delay in capturing evidence. In prior art systems all of the evidence data sensing is controlled by SOC 110 and sent to output interface LTE 170/Wi-Fi 180/BLE 180/SD card 190. The total power consumption on operational mode may jump from 200 mW up to a few Watts on some dashcams. On some connected dashcams LTE 170 is also in standby mode, consuming up to a few mW, and acts as another trigger.

SUMMARY

Embodiments of the present invention provide a power management system for dashcams, overcoming the challenges of latency in capturing evidence, and the inability to capture data prior to the impact, and thus resolving loss of vital evidence. Embodiment of the present invention introduce an "always-on" mode.

The present invention relates to dashcams that are not hard-wired to a vehicle battery; as such, no special skill or installation is required to install them.

There is thus provided in accordance with an embodiment of the present invention a system for dashcam power management, including an image sensor mounted on a vehicle capturing image data near or inside the vehicle, a microphone mounted on the vehicle recording audio data near or inside the vehicle, a memory storing image data captured by the image sensor, a buffer temporarily storing image data captured by the image sensor and audio data recorded by the microphone, an inertial measurement unit (IMU) that senses an impact on the vehicle, a switch connected to the image sensor, a main system on chip (SOC) microcontroller connected to the image sensor via the switch, that stores image data captured by the image sensor and audio data recorded by the microphone in the memory, the main SOC being in a dormant power mode while the vehicle is parked or idle, and in an active power mode while the vehicle is moving, and transitioning from dormant mode to active mode when the IMU senses that the vehicle suffers an impact, a low-power secondary SOC microcontroller connected to the image sensor via the switch, to the microphone, and to the IMU, that manages power of the system and stores image data captured by the image sensor and audio data recorded by the microphone in the buffer, such that the buffer stores image data and audio data that was respectfully captured and recorded prior to and upon the IMU detecting an impact on the vehicle, while the main SOC transitions from dormant mode to active mode, and transmits the buffered data to the main SOC when the main SOC is in active power mode, thereby avoiding loss of vital data during the transition time while the main SOC loads its firmware and smoothly takes over the image sensor, and a battery providing power to the image sensor, the microphone, the buffer, the IMU, the switch, the main SOC, and the secondary SOC.

BRIEF DESCRIPTION OF THE DRAWINGS

The present invention will be more fully understood and appreciated from the following detailed description, taken in conjunction with the drawings in which.

For reference to the figures, the following index of elements and their numerals is provided. Similarly numbered elements represent elements of the same type, but they need not be identical elements.

| Table of elements in the figures | |
| --- | --- |
| Element | Description |
| 100 | prior art power management system for a dashcam |
| 110 | system-on-chip (SOC) |
| 120 | global navigation satellite system (GNSS) |
| 130 | inertial measurement unit (IMU) |
| 140 | image sensor |
| 150 | microphone |
| 160 | power management unit (PMU) |
| 170 | long term evolution (LTE) module |

-continued

Table of elements in the figures

| Element | Description |
| --- | --- |
| 180 | Wi-Fi/BLUETOOTH ® Low Energy (BLE) transmitter |
| 190 | a secure digital (SD) non-volatile flash memory card |
| 200 | novel power management system for a dashcam |
| 210 | main system-on-chip (MSOC) |
| 220 | secondary system-on-chip (SSOC) |
| 230 | switch |
| 240 | rolling buffer static random-access memory (SRAM) |
| 250 | monitor for temperature and battery level |

BRIEF DESCRIPTION OF THE TABLES

The present invention will be more fully understood and appreciated from the following detailed description, taken in conjunction with the tables in which:

TABLE I is an exemplary breakdown of always-on SSOC power consumption, in accordance with an embodiment of the present invention;

TABLE II is an exemplary comparison of features for a conventional dashcam in accordance with an embodiment of the present invention;

TABLE III is an exemplary escalating parking mode scheme, in accordance with an embodiment of the present invention; and TABLE IV is an exemplary comparison of configuration and buffer size, in accordance with an embodiment of the present invention.

DETAILED DESCRIPTION

The present invention relates to dashcams that are not hard-wired to a vehicle battery; as such, no special skill or installation is required to install them. In accordance with embodiments of the present invention, systems are provided for power management for dashcams, overcoming the challenges of latency in capturing evidence, and the inability to capture data prior to the impact, and thus resolving loss of vital evidence.

Figure 1:
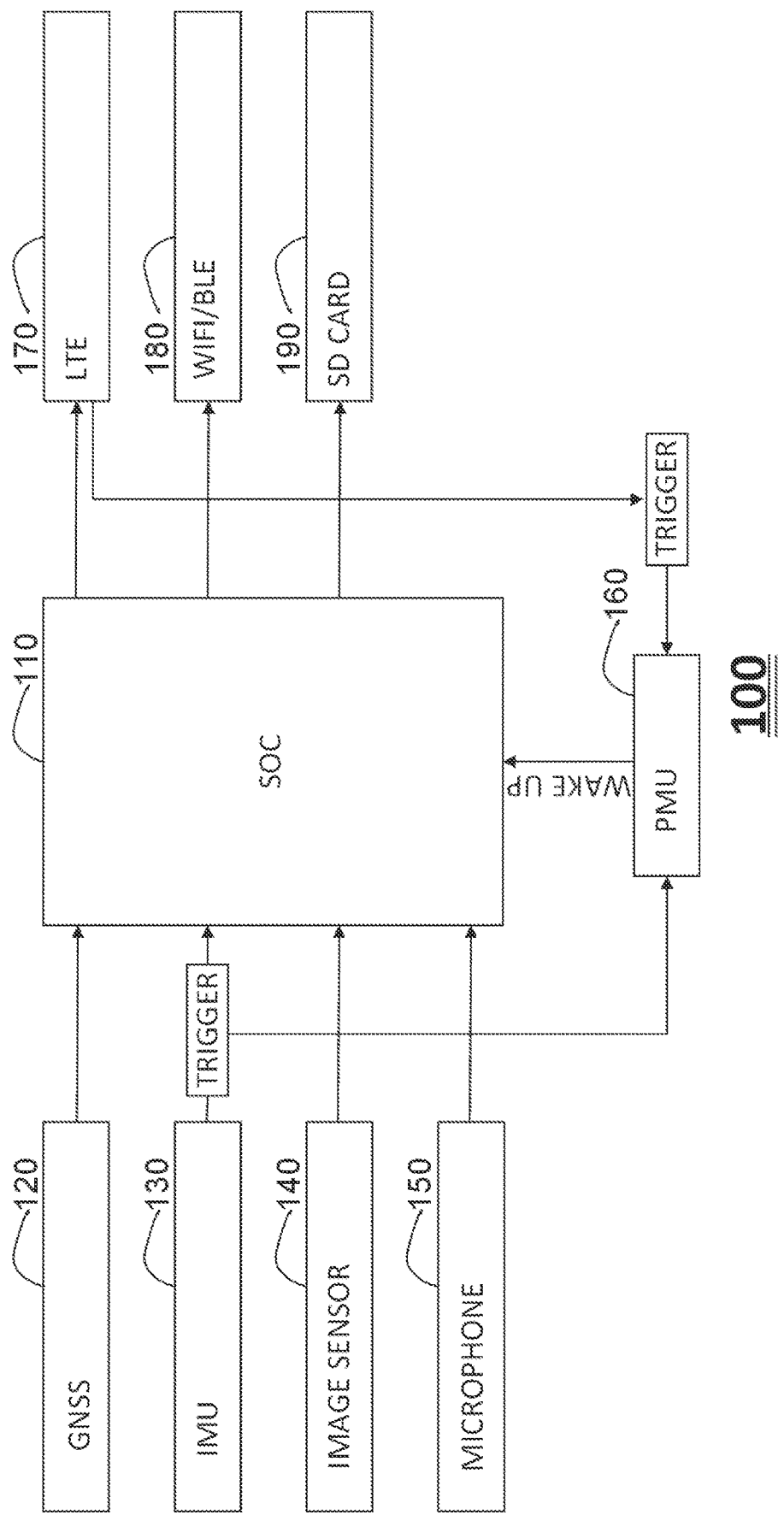
FIG. 1 is a prior art power management system 100 for dashcams.
Figure 2:
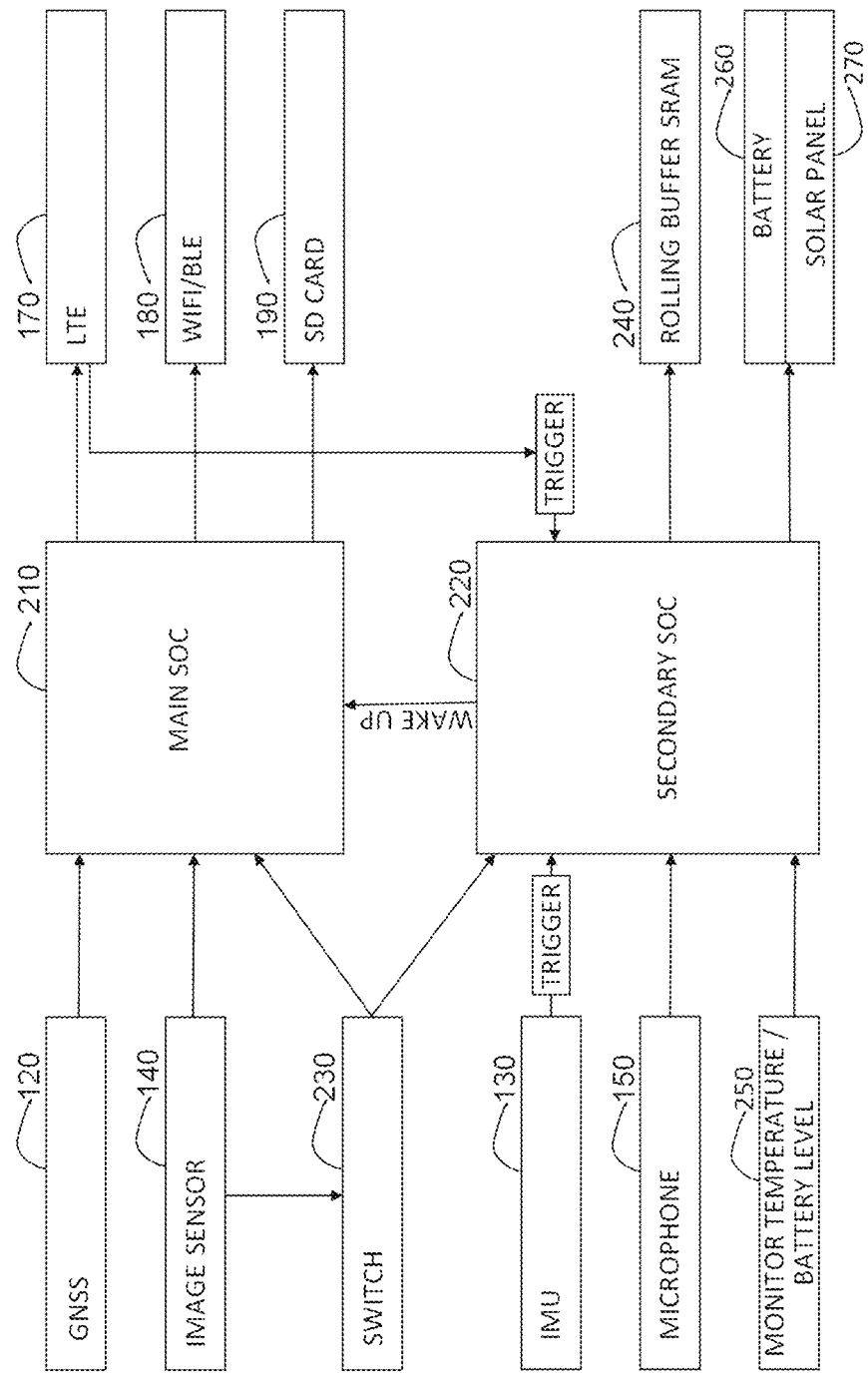
FIG. 2 is a simplified diagram of a low-power management system 200 for dashcams, in accordance with an embodiment of the present invention.

Reference is made to FIG. 2, which is a simplified diagram of a low-power management system 200 for dashcams, in accordance with an embodiment of the present invention. Instead of using one SOC 110 and a basic PMU 160 to control the dashcam, as in FIG. 1, system 200 is provided where all of the sensing components that are used for evidence in case of collision, theft or other incidents, are connected through an ultra-low power secondary SOC (SSOC) 220 that acts also as a power management solution and a logging device combined. SSOC 220 is connected to and power manages a battery 260 and/or a solar panel 270. System 200 further includes a switch 230, a rolling buffer SRAM 240, and a monitor 250 for temperature and battery level. System 200 for the dashcam brings the best from the low power logging device and the high power dashcam to create a new user experience.

In an embodiment of the present invention, SSOC 220 replaces the simple PMU microcontroller 160, to allow acting as an evidence collector. The low-power IMU 130 and microphone 150 are connected to SSOC 220. Image sensor 140 is switched between SSOC 220 and a main SOC (MSOC) 210 according to operation mode. An additional dedicated rolling buffer SRAM memory 240 is used to avoid activating the power-hungry SD card 190/main RAM and to avoid degrading their life span due to writing operations. In system 200 when moving to a new mode, which is referred to herein as the "always on" mode, SSOC 220 logs low fps, low resolution image sequence, audio and IMU 130 to rolling buffer 240 on the SRAM, and wakes up MSOC 210 if impact or other triggers are detected. Once MSOC 210 is woken up, SSOC 220 passes the recorded buffer to MSOC 210 as well as the camera control. Camera control switch 230 is fast, and MSOC 210 configuration of the camera takes a few ms to 100 ms, depending on image sensor 140. This approach allows smooth transition from low frame rate to high frame rate when MSOC 210 is running. and provides continuous evidence from before to after a parking incident.

Reference is made to TABLE I, which is an exemplary breakdown of always-on SSOC 220 power consumption, in accordance with an embodiment of the present invention. The total power is 41 mW which is an order of magnitude less power compared to normal running mode. All of the values are taken from real used components.

System 200 introduces an "always on mode", which enables providing evidence prior to a parking incident while still allowing long time operation.

Reference is made to TABLE II, which is an exemplary comparison of features for a conventional dashcam in accordance with an embodiment of the present invention. Specifically, TABLE II compares power consumption and features for a typical dashcam with 620 mAh 3.7V battery, 2300 mW, where one uses a 48% power margin to accommodate the reduced performance over the device lifetime (1200 mWh).

While a vehicle is driving, the normal operation mode is used to allow gathering highest detail and frame rate of visual evidence, and storing it on SD card 190 for a few hours' long rolling evidence. On parking the vehicle, to prevent battery drain in case of power off; e.g., a typical cigarette lighter charger in an electric car, or to prevent shortening life span of SD card 190 and other components in powered on connectors, such as hardwired kits, the dashcam switches to the always-on mode, during which the dashcam continues collecting evidence on a lower bandwidth and a shorter time window. Eventually when reaching low battery level, the always-on mode switches to connected parking mode, and eventually to deep parking mode. This is carried out in steps that take into account the power needed to wake up and write evidence to SD card 190 (about 1 min/20 mW) or until the event ends and data is uploaded to the cloud (about 10 min/200 mW).

If a battery level indicator is accessible to SSOC 220, quality degradation is finer; for example from 30 fps 1080p on driving, to 5 fps 720p always-on when parking, to 1 fps 360p at 50%, and so on until full classic parking mode is set.

Reference is made to TABLE III, which is an exemplary escalating parking mode scheme, in accordance with an embodiment of the present invention. TABLE III shows an example of an escalating parking mode scheme.

In the exemplary scheme, a vehicle reaches a mode that fits most common computers during weekdays. During the weekend, the vehicle may fall back to connected or deep parking mode, to avoid total stop of protection.

Implementation Details

Implementation of the always-on parking mode together with SSOC 220 takes many forms.
1. As SSOC 220+MSOC 210 combination where SSOC 220 replaces the role of PMU 160 and adds logging capabilities;

2. Where SSOC 220 is part of MSOC 210 as a subsystem within an SOC itself;
3. As an external unit/add on to the main dashcam, controlling the dashcam power externally and transmitting data wired or wirelessly;
4. SSOC 220 may be as a fully external device with its own sensors where the communication with MSOC 210 uses low power BLE where the offender management unit (OMU) on MSOC 210 is also BLE enabled;
5. SSOC 220 may be powered by solar panel 270 for years of operation instead of hours/days where it lasts the nights in low power mode; and
6. 360° coverage—in this mode a multiple dashcam array is used where each dashcam has a solar panel chosen to provide on daily average more than the low-power mode consumes. One of the dashcams is connected to power and runs in normal mode on driving. The solar powered dashcams continue running on low power always when BLE 180 is working. In case of an incident, the dashcam that is connected to the vehicle power wakes up others to obtain 360° evidence, and stream the evidence to the power connected dashcam for further processing. This mode may also be used without any connection to power where the solar or wind, or another low power input, dashcam sends data to the cloud.

There are many alternatives for power optimization that depend on actual modules used. Power modulation of different components is optimized according to the data rate and memory constraints, to allow operation in bursts and then moving back to idle.

In SSOC 220 connected components, there are three primary alternatives per component that collects evidence.
1. Connect directly to SSOC 220;
2. Switch between SSOC 220 and MSOC 210 depending on operation mode; and
3. Connect to MSOC 210, in case its power is too high, or not needed on the use cases for low power.

A typical configuration may be as such:
1. Connected to SSOC 220: Audio and IMU 130 are low power and low bandwidth, such that SSOC 220 streams them directly to MSOC 210 on normal operation mode, and to SRAM on low power;
2. Switched: Image sensor 140, the full operation video stream is too demanding for SSOC 220, so upon switching the camera is reconfigured to the proper operation mode to scale power and bandwidth according to the mode.
3. Connected to MSOC 210: GNSS 120, as for parking mode user case, one may assume that the vehicle is at the same location as last observed, due to the high power of the component.

To provide images that fit the always on small SRAM size, it is preferable to avoid raw data output and use image sensors that produce JPEG images or another compressed format. In addition, it is important to use sensors where the power consumption is linear, as much as possible, with frame rate and resolution. When using flash memory, which can be considerably larger at the same cost, raw data format is also a factor.

Interface support of image sensor 140 matches SSOC 220 and MSOC 210, to allow switching between them. In some implementations of the present invention, switch 230 is optional and SSOC 220 itself is the switch, passing data through in driving while logging it in parking mode. In these embodiments, image sensor 140 is connected to SSOC 220, and SSOC 220 passes data to MSOC 210 instead of using switch 230.

An alternative embodiment of the present invention for power saving is to use multiple low resolution, ultra low power image sensors 140, and create a dashcam large field of view using more than one lens. This embodiment has following advantages:
1. Modulating the sampling between image sensors 140 to get cheaper and low power cameras to produce a wide field of view.
2. Use of a basic motion tracking to increase fps only for a relevant image sensor 140, thus providing smoother video on area of interest. This embodiment may also be used with a high FOV high resolution dashcam having a setting for area of interest, but with smaller impact on power.
3. Obtain thinner design of the dashcam as multiple image sensors 140 that are slightly different at angle provide a needed FOV with smaller lenses.

Another embodiment of the present invention uses two image sensors 140; namely, one low end low power image sensor 140 for always-on, and another image sensor 140 for driving mode, whereby upon impact SSOC 220 immediately switches to the high end image sensor 140 until MSOC 210 is up and running.

In an alternative embodiment of the present invention, a single low power image sensor 140 with low resolution and FOV is equipped with a tiny motor to allow rotation around a selected axis or multiple axes, where in parking mode image sensor 140 immediately changes orientation according to a direction of impact as observed by IMU 130, or by using other low power detection means, such as low power radar.

The always-on parking mode may also be used to allow in-driving. to prevent reaching a state of overheat and camera shut down. By monitoring camera temperature, either from IMU 130 or from another source (battery/SOC/dedicated sensor), the device detects in advance that overheat is trending, and switches to the always-on mode to allow cooling while continuing to collect data. This can be either modulation of normal and always-on mode, or a full switch to always-on until full cooldown is reached. In always-on mode. collision detection algorithms run on IMU 130 data to provide improved detection confidence compared to threshold-based methods.

Monitor 250 monitors dashcam temperature and power level in low power mode using SSOC 220 to modulate its operation, or runs continuously if its power consumption is low enough. The temperature and battery level are logged to rolling buffer 240 for later use and inspection.

In addition to logging ability that the always-on mode provides, algorithms that provide improved triggering as compared to the conventional threshold-based G-impact detection, are run. This is based on time series analysis of the acceleration and audio signals, and training of tiny AI models.

There are three main factors for selecting rolling buffer memory module 240:
1. Size
2. Power consumption
3. Durability Size considerations are the window of time before the event trigger that is needed, which is denoted by $time_{back}$. The time that takes MSOC 210 to load its firmware and be able to smoothly take over the camera, is denoted $time_{up}$. As such, the overall time window is $time_{back}+time_{up}$. The desired frame rate and resolution of the image sensor, audio bitrate and IMU 130 frequency add up together to be the buffer-bitrate.

Reference is made to TABLE IV, which is an exemplary comparison of configuration and buffer size, in accordance with an embodiment of the present invention. The example in TABLE IV corresponds to configurations and required buffer sizes for $time_{back}$=10 seconds and $time_{up}$=10 seconds, total of 20 seconds time window for rolling buffer 240. Alternatives for these Sizes Include Inter Alia CMOS, Flash, SRAM Power consumption alternatives are:
1. Active power consumption;
2. Option for sleep/deep sleep; and
3. Time of modulation between modes.

Since rolling buffer 240 fully rewrites every window of operation, typically 3 times per min., durability of memory is an important factor. This factor favors SRAM-type solutions. If NAND flash is used, the size should be a factor of at least 100×, depending on the flash write durability cycles, to avoid a high rate of errors.

To lower use of SRAM, which is more expensive than flash memory, a combination of those types may be used, whereby the SRAM is used for rolling buffer 240 up to the point of event trigger, and afterwards SD card 190 or flash may be used instead. This avoids write cycles on the less durable memory types, and allows unrestricted load time for MSOC 210.

To allow reaching optimal power saving with buffer memory for the evidence, if the memory device, such as SRAM, supports sleep/deep sleep with fast operation mode change, usually sub-ms, the modes may be modulated to reach a high level of power reduction.

To achieve the above, SSOC 220 buffers on its own memory the audio and IMU 130 in-between image frames. This allows a burst of data write to SRAM and returning to sleep/deep sleep mode with order of magnitude less power. At 3 fps video, the audio size for a third of a second, on 44 Khz, 12 bit mono is 23 Kb, so this is a requirement on SSOC 220 cache size, as for IMU 130 for six degrees of freedom (DOF). Accelerometer and gyro at 50 Hz provide 0.2 KB, such that this is not an issue. Thus, on new images available SRAM is awakened, passed IMU 130 and audio data, pass through the image, and then set back to sleep. The burst mode may be used to push SSOC 220 power down using modulation of mode on SSOC 220 itself where it goes to sleep between images from image sensor 140, and image sensor 140 triggers an SSOC interrupt to allow SSOC 220 to fetch a new image, where the same may happen with IMU 130 with the first-in-first out (FIFO) capability that allows internal storage and pass of data in bursts every 1 second, depending on FIFO size and frequency. For audio, a specific module with buffering capabilities is used as well, or alternatively this capability for power savings is omitted.

When each sensing module has its own internal cache and SSOC 220 has limited internal storage, an alternative embodiment of the present invention operates with interrupts from each sensing module, when SSOC 220 cache is full, that wake up both SSOC 220 and the storage, to allow asynchronous burst mode while still lowering overall power consumption.

Embodiments with analog sensors use analog-to-digital (ADC) converters that have internal memory, and optionally send an interrupt to SSOC 220 to mimic the sensors with the FIFO option. These embodiments are of advantage for audio input, which generally lacks buffering capability, to obtain burst mode operation both on SSOC 220 and the storage device.

For low power mode of always-on, wind/solar and another wireless power source may be used to extend operation, or to allow it to be re activated periodically.

When considering solar power panel 270 and the fact that the dashcam is placed toward the road/cabin and has a mount placed on the windshield, the mount may have solar panel 270 with a transparent adhesive or suction cup.

For an always-on power consumption of 40 mWh, the needed solar panel 270 size in places like California with six peak sun hours is 6 W with an off the shelf 11×6 cm 1 W rated panel on idle conditions. Since the panel for this example is in the mount, this reduces to about 25% according to direction of parking to about 250 mW, with 40 mW consumption per hour. This suffices not only to power the dashcam during daylight with always-on mode, but also to allow charging the dashcam battery for overnight classic parking mode. For use cases like back of a truck where solar panel size is not restricted and panels may be ideally placed, one reaches a few Watts average per day and the "always on" operation with a dashcam that is fully wireless with 3W solar panel rating.

Always-on mode opens many new multi-camera configurations with minimal setup complexity where only one or even none of the dashcams needs wiring. This is possible using solar or other low power charging methods, like nuclear battery, that allow long low power output operation. The dashcams run on low power always-on mode and are activated from a main dashcam/LTE trigger/motion sensor/radar/touch or another source, and may wake each other up to record evidence and upload it either individually or using the main dashcam as a gateway.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

TABLE I

Always-On Mode SSOC Power Consumption Breakdown

| Component | Power | Function | Comments |
| --- | --- | --- | --- |
| SSOC | 20 Mwh | Save data to the SRAM/control the rolling buffer. Wake up the MSOC on trigger. | Selected ssoc performance requirement are very low and compute is about 50 MHz. |
| SRAM | 5 Mwh | Store the rolling buffer. | Original power is 20 mw and lower power is obtained by modulating on/standby by when new frame arrives from the image sensor. |
| IMU | 0.1 Mwh | Provide evidence in case of collision, direction of hit, severity. Provide a trigger for the SSOC to pass and wake the MSOC. | In case of low battery level and move to the deep/connected parking mode, the IMU also wakes up the SSOC. |
| Microphone | 1 Mwh | Audio evidence. | Mono. |
| Temperature and battery level sensor | 0.1Mwh | Provide battery level and temperature for | Critical component to allow flexible use of the battery and protecting |

TABLE I-continued

Always-On Mode SSOC Power Consumption Breakdown

| Component | Power | Function | Comments |
|---|---|---|---|
| | | smart mode switching. | the device. |
| Image sensor | 6 Mwh | Provide basic vision evidence. | 1-3 fps 720/480 p resolution with jpg output format. |
| LTE | 9 Mwh | Allow activating the camera from the customer phone/remote service. | LTE will work in standby mode to pick up wake up requests only. |

TABLE II

Comparison of Power Consumption and Dashcam Features

| Power mode | Use case | Power consumption | Operation duration | Main operational components | Evidence |
|---|---|---|---|---|---|
| Normal | Driving | 1200 Mwh | 1 h | MSOC, RAM, GNSS, LTE, Wi-Fi, BLE, Image sensor, IMU, microphone, SSOC | 1080 p 30 fps video, dual audio, 200 Hz IMU, 10 Hz location. prior evidence according to SD card capacity. |
| Always on | Parking, overheat protection | 41 Mwh | 30 hours | SSOC, SRAM, IMU, LTE (standby) | 720 p 3 fps, 50 Hz IMU, mono audio 20 seconds prior event. |
| Connected parking mode | Long range parking | 10 Mwh | 5 days | SSOC, IMU, LTE (standby) | Normal mode 10 seconds after the event. |
| Deep parking mode | Low battery survival | 1 Mwh | 50 days | SSOC, IMU | Normal mode 10 seconds after the event. |

TABLE III

Escalating Parking Mode Scheme

| State | Remaining power (Mwh) | Duration |
|---|---|---|
| Initial state, entering parking | 1200 | 0 |
| Always on mode | 500 | 17 hours |
| Connected parking mode | 300 | 20 hours |
| Deep parking mode | 200 | 100 hours |

TABLE IV

Exemplary Configurations and Buffer Sizes

| Configuration type | Video | Audio (mono) | IMU 3DOF | Total size |
|---|---|---|---|---|
| Low definition | 2 FPS<br>60 p<br>40 KBS | 12 Khz<br>12 bit<br>18 KBS | 25 Hz<br>16 bit<br>0.15 KBS | 1.2 MB |
| Medium definition | 3 FPS<br>480 p<br>120 KBS | 44 Khz<br>12 bit<br>66 KBS | 50 Hz<br>16 bit<br>0.3 KBS | 3.6 MB |
| High definition | 5 fps<br>720 p<br>500 KBS | 48 KHz<br>16 bit<br>100 KBS | 100 Hz<br>16 bit<br>0.6 KBS | 12 MB |

What is claimed is:

1. A system for dashcam power management, comprising:
an image sensor mounted on a vehicle capturing image data near or inside the vehicle;
a microphone mounted on the vehicle recording audio data near or inside the vehicle;
a memory storing image data captured by said image sensor;
a buffer temporarily storing image data captured by said image sensor and audio data recorded by said microphone;
an inertial measurement unit (IMU) that senses an impact on the vehicle;
a switch connected to said image sensor;
a main system on chip (SOC) microcontroller connected to said image sensor via said switch, that stores image data captured by said image sensor and audio data recorded by said microphone in said memory, the main SOC being in a dormant power mode while the vehicle is parked or idle, and in an active power mode while the vehicle is moving, and transitioning from dormant mode to active mode when said IMU senses that the vehicle suffers an impact;
a low-power secondary SOC microcontroller connected to said image sensor via said switch, to said microphone, and to said IMU, that manages power of the system and stores image data captured by said image sensor and audio data recorded by said microphone in said buffer, such that said buffer stores image data and audio data that was respectfully captured and recorded prior to and upon said IMU detecting an impact on the vehicle, while said main SOC transitions from dormant mode to active mode, and transmits the buffered data to said main SOC when said main SOC is in active power mode, thereby avoiding loss of vital data during the transition time while said main SOC loads its firmware and smoothly takes over said image sensor; and
a battery providing power to said image sensor, said microphone, said buffer, said IMU, said switch, said main SOC, and said secondary SOC.

2. The system of claim 1 wherein said image sensor operates in a high-power mode and captures high bandwidth high frame rate, high resolution image data while said switch connects said image sensor to said main SOC, and operates in a low-power mode and captures low bandwidth, low frame rate, low resolution image data while said switch connects said image sensor to said secondary SOC.

3. The system of claim 2 wherein said secondary SOC lowers the bandwidth, the frame rate and the image resolution on a graduated schedule, based on a current indication of the level of said battery.

4. The system of claim 2 further comprising multiple dashcams that together provide 360° image data coverage, each dashcam comprising a solar panel or a wind-based power supply that supplies more power to the dashcam than the power required for the low-power mode, wherein a primary one of the dashcams is connected to said battery and runs in high-power mode when the vehicle is driving, and wherein upon detection of an impact by said IMU, the primary dashcam wakes up the others of the dashcams in order to obtain 360 image and data evidence, and the others of the dashcams, which stream their captured image data to the primary dashcam.

5. The system of claim 2 further comprising multiple dashcams that together provide 360° image data coverage, each dashcam comprising a solar panel or a wind-based power supply that supplies more power to the dashcam than the power required for the low-power mode, and sufficient power to upload the dashcam's captured image data to a cloud server.

6. The system of claim 2 where the dashcam transitions from high-power mode to low-power mode when the vehicle is driving, in response to detecting an overheating of a temperature of the dashcam.

7. The system of claim 1 wherein said secondary SOC is a portion of said main SOC.

8. The system of claim 1 wherein said secondary SOC is an external device with its own sensors, and wherein said secondary SOC communicates with said main SOC using BLUETOOTH® low energy (BLE).

9. The system of claim 1 wherein said secondary SOC is powered by a solar panel.

10. The system of claim 1 wherein said image sensor uses power consumption that is substantially proportional to frame rate and image resolution.

11. The system of claim 1 wherein said image sensor generates compressed format image data.

12. The system of claim 1 wherein said image sensor is mounted on a dashboard of the vehicle, and comprises a solar panel with transparent adhesive or a suction cup.

* * * * *